Figure 1:
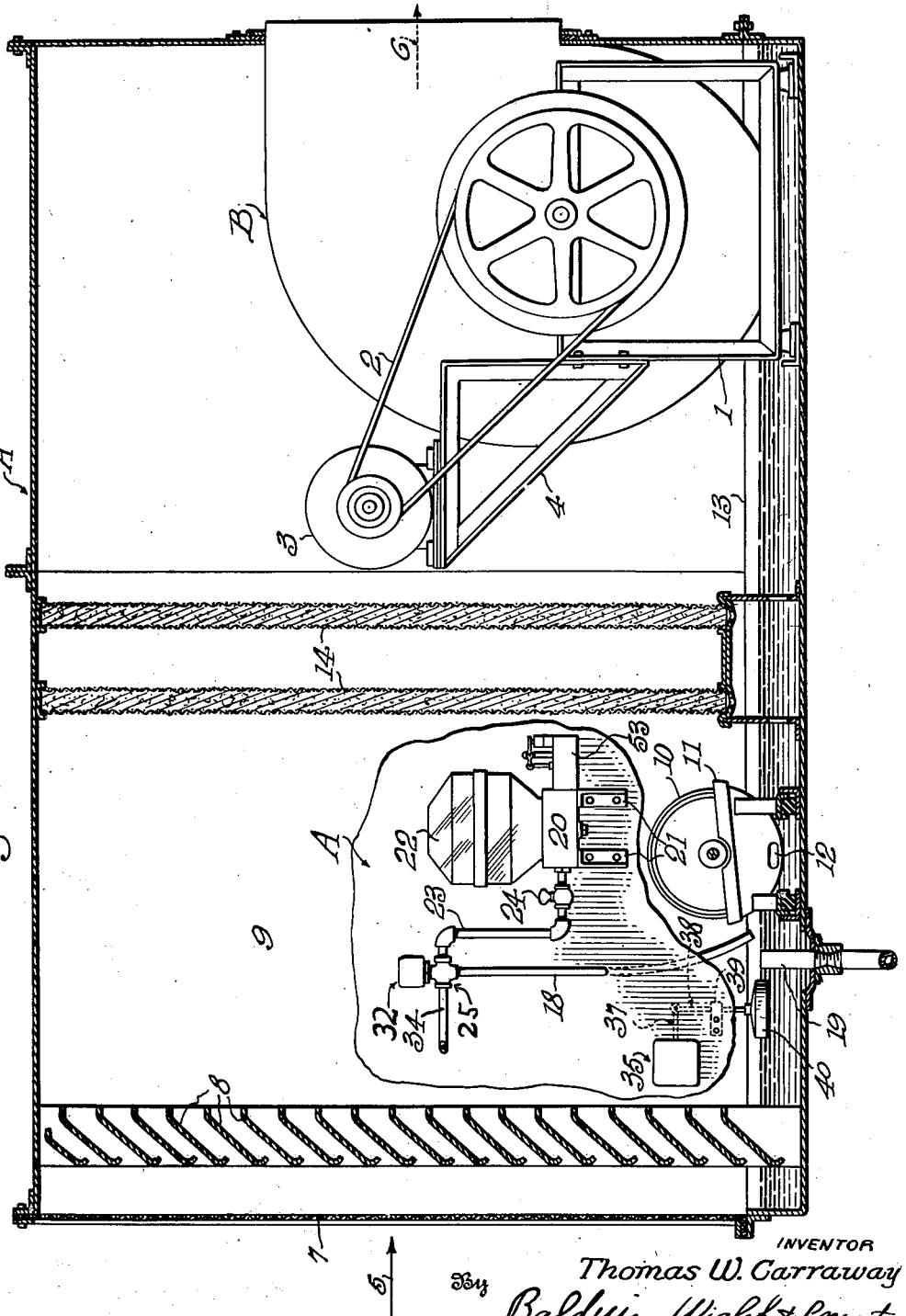

March 17, 1953     T. W. CARRAWAY     2,631,829
AIR AND LIQUID CONTACT APPARATUS
Filed Dec. 24, 1947     2 SHEETS—SHEET 1

INVENTOR
Thomas W. Carraway
By Baldwin, Wight & Prevost
ATTORNEYS

March 17, 1953 T. W. CARRAWAY 2,631,829
AIR AND LIQUID CONTACT APPARATUS
Filed Dec. 24, 1947 2 SHEETS—SHEET 2

INVENTOR
Thomas W. Carraway
By Baldwin, Wight, & Prevost
ATTORNEYS

Patented Mar. 17, 1953

2,631,829

UNITED STATES PATENT OFFICE 2,631,829

AIR AND LIQUID CONTACT APPARATUS

Thomas W. Carraway, Dallas, Tex.

Application December 24, 1947, Serial No. 793,713

4 Claims. (Cl. 261—26)

This application is a continuation-in-part of my copending application, Serial No. 565,839, filed November 30, 1944, now Patent No. 2,437,936.

This invention relates to air and liquid contact apparatus and, in the form shown, relates more particularly to apparatus of the kind in which air is washed and/or cooled by contact with a liquid, e. g. water, which is dispersed or diffused in a stream of air flowing to the conditioned area.

In a well known form of apparatus of this class water is delivered to and diffused in the air stream at a rate much greater than the rate at which it is carried away by the air being conditioned, so that a large amount of water is precipitated to the bottom of the washing or cooling chamber or duct. For economy, it is customary to collect the precipitated water and re-circulate it, that is, deliver it back to the air stream in dispersed or diffused condition, together with make-up water added to replace the water carried from the washing or cooling zone by the air.

Inevitably, foreign matter, including harmful bacteria and odor-producing substances, is carried into the washing or cooling zone with the entering air. When the foreign matter is removed from the air, as of course is desired, it gets into the evaporative liquid circuit, and if not destroyed or its development inhibited it causes the liquid to become unsanitary, and to produce a disagreeable odor in the conditioned area.

It is known that the addition of certain treating liquids to the evaporative fluid used in apparatus of the kind referred to reduces, to a marked extent, the undesirable effects otherwise resulting from absorption of foreign matter in the evaporative liquid. For example, adding triethylene glycol is believed, by some authorities, to arrest the development or spread of cold virus. Also, a wetting agent may be added to the evaporative liquid for enhancing its ability to remove solid particles, e. g. dust and pollen, from the air stream.

An object of the present invention is to provide improved means for adding controlled amounts of treating liquid, e. g. a germicide, fungicide, or wetting agent, to the evaporative liquid for promoting the delivery of properly conditioned air in a sanitary state, free of unpleasant odor, and from which entrained foreign matter in particle form has been removed to a maximum extent.

Another object of the invention is to provide improved apparatus for automatically controlling the operation of a liquid contact type air conditioner in dependence upon the availability of evaporative liquid and/or treating liquid in sufficient quantities to bring about the desired results referred to above.

Figure 2:
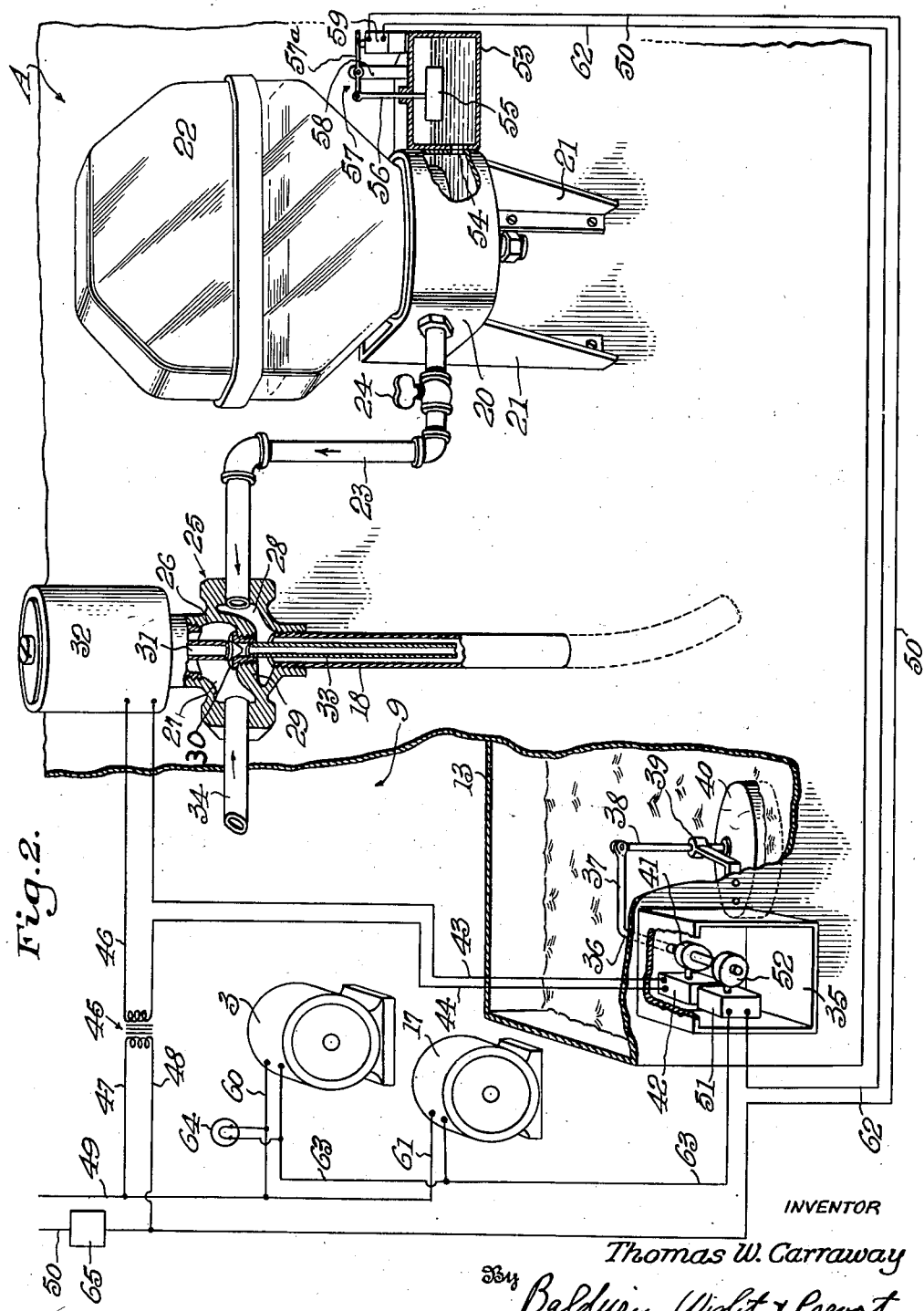

Other objects of the invention will become apparent from a reading of the following description, the appended claims, and the accompanying drawings, in which:

Figure 1 is a longitudinal vertical section of one form of air conditioning apparatus embodying the invention, some parts being shown in elevation; and Figure 2 is a fragmentary perspective view drawn on an enlarged scale and showing mechanism for controlling the supplying of evaporative liquid and treating liquid, electrical control circuit means being illustrated diagrammatically.

The invention is illustrated as being embodied in air conditioning apparatus of the evaporative air-liquid contact type, including a casing or duct A and conventional equipment such as a blower B for moving air through the casing or duct for being conditioned. The blower B is mounted on a bracket or frame 1, and is driven through a belt 2 by an electric motor 3 supported on a bracket 4. The blower may be of any suitable or known kind, the structural details of which are not significant with respect to the substance of the present invention. When the blower is running, air enters the duct A in the direction of the arrow 5 in Figure 1, passes through the duct A to the center of the blower, and is then discharged from the blower as indicated by the arrow 6.

The air flowing through the duct A first passes through a wire mesh screen 7, which prevents entrained leaves, large insects, or other sizeable particles or foreign matter from entering the duct. The air then passes through louvers or vanes 8 and into a liquid contact chamber 9 in which washing or evaporative liquid, e. g. water is maintained constantly in a dispersed or diffused condition so as to be contacted by the air to cool the latter by evaporation of the liquid and to remove pollen, dust particles, and other foreign matter from the air stream, in a well known manner. Any suitable or known means may be provided for diffusing or dispersing the liquid in the chamber 9. In the form shown, a plurality of motor-driven discs, one of which is shown at 10 in Figure 1, is deployed across the duct A, and each disc is journalled with its lower portion extending down into a pan 11 adapted to contain a supply of evaporative fluid introduced through an opening 12. As fully explained in my Patent 2,437,936, referred to above, counterclockwise rotation of the discs causes the evaporative fluid to be dispersed throughout the chamber 9.

Some of the liquid dispersed in the chamber 9 will be carried out of the treating chamber 9 with the air stream, but a very considerable portion of the liquid will descend to the bottom of the chamber to be collected by precipitation or settling in a tank 13 at the bottom of the tube A. Air drawn beyond or to the right of the treating chamber 9 passes serially through filter packs 14 of any suitable kind, which serve to remove from the air stream any solid particles which have not been removed by the dispersed liquid itself, and which also serve to catch or intercept unevaporated droplets of liquid which have not descended directly to the tank 13. Moisture thus intercepted by and collected on the filter packs 14 will drain down through the packs into the tank 13. When the air leaves the filter packs 14 it is fully conditioned and is delivered by the blower B to the conditioned area.

An electric motor 17 is provided for driving the disc equipment 10. Make-up liquid for replacing liquid which is removed from the conditioning chamber 9 along with the air being conditioned is supplied to the tank 13 by a make-up delivery pipe or conduit 18. An overflow pipe 19 is provided for preventing the liquid in the tank 13 from rising above a predetermined maximum height or level.

The apparatus described above is generally similar to the apparatus disclosed in my copending application referred to above. The invention claimed in the present application resides in apparatus to be described hereinafter and in the combination of the apparatus still to be described with the air conditioning apparatus described above or other conditioning apparatus intended for the same class of service.

In accordance with the present invention, improved apparatus is provided for adding a treating or supplemental conditioning liquid to the evaporative liquid, so that a proper mixture of the two liquids will be delivered to the discs 10 or other liquid dispersing or diffusing devices. The invention is not limited to or especially concerned with the exact nature of any particular treating liquid. Thus, liquid such as triethylene glycol may be used for arresting or destroying cold virus, or any of the well known wetting agents may be employed for enhancing the dust and pollen-removing qualities of the evaporative liquid. It is an important feature of the invention, however, that the improved apparatus automatically and efficiently controls the adding of the treating liquid so as to maintain a constant ratio of a treating liquid to evaporative liquid in the mixture.

In the form shown, a treating liquid reservoir 20 is mounted by brackets 21 on the duct A. An inverted container or bottle 22 is supported on the reservoir 20 in a well known manner for maintaining the treating liquid at a substantially constant level in the reservoir 20. A pipe connection 23, fitted with a flow control valve 24, leads from the reservoir 20 to an aspirator type injector generally designated 25 located at the top of the delivery pipe 18. As shown in Figure 2, the injector 25 comprises a casing 26 provided with chambers 27 and 28, separated by a wall or partition 29, provided with a valve seat 30 on which a valve plunger 31 normally rests. The valve plunger 31 extends upwardly to constitute the plunger of a solenoid device generally designated 32, and may be provided with a spring (not shown) for yieldably urging the plunger into engagement with the seat 30. A tube 33 is fitted tightly in, and is secured to the valve seat member 30, and extends down into the delivery pipe 18.

A pipe 34, connected to any suitable source of supply of evaporative liquid (not shown), communicates with the injector chamber 27; and the pipe 23, previously referred to, communicates with the injector chamber 28. When the valve plunger 31 is raised by energization of the solenoid 32, evaporative liquid will flow from the pipe 34 into the chamber 27, and thence through the valve seat 30 and into the tube 33 for delivery into the tank 13 to replenish liquid lost by evaporation. Liquid discharged at the lower end of the tube 33 and within the pipe 18 will produce an injector effect, creating a suction in the upper part of the pipe 18, the chamber 28, and the pipe 23, so as to draw treating liquid up from the reservoir 20 for delivery into the pipe 18, wherein the treating and evaporative liquids are mixed, and the mixture then delivered to the tank 13. The proportions of treating liquid and evaporative liquid delivered to the tank 13 may be varied by adjusting the setting of the valve 24. Once the valve has been set, the proportions of the two liquids in the mixture will be maintained substantially constant. In this way it is possible always to maintain enough treating liquid in the mixture to accomplish the desired results without, however, supplying more treating liquid than is needed with consequent unnecessary expense.

Improved mechanism is provided for controlling the delivery of the liquids to the tank 13, and for controlling the operation of the entire system in dependence upon the maintenance of an adequate supply of properly proportioned liquids in the tank 13. In the form shown, a switch box 35 is mounted on the duct A above the level of the liquid in the tank 13. Journaled in the switch box 35 is a rock shaft 36 having an arm 37, the outer end of which is pivotally connected to the top of the rod 38 mounted to slide in a guide 39 and fixed at its lower end to a float 40. Fixed to the rock shaft 36 is a cam 41 adapted to operate the movable element of a normally open micro-switch 42 which is in circuit with the solenoid 32. The cam 41 is of such contour, and is so positioned on the shaft 36 that when the liquid is at a predetermined proper normal level in the tank 13, and the float is at a corresponding level, the switch 42 will be open; but when the liquid level and the float 40 descend to a predetermined lower level, the cam 41 will close the switch 42. As shown in Figure 2, conductors 43 and 44 lead from the switch respectively to the solenoid 32 and to one side of the secondary winding of a transformer 45, the other side of the winding being connected through a conductor 46 to the solenoid 32. The primary winding of the transformer 45 is connected by conductors 47 and 48 to power supply lines 49 and 50.

In operation, when the liquid in the tank 13 descends to a predetermined level, the float 40 falls so as to rock the cam 41 and close the switch 42, thereby energizing the solenoid 32, and raising the valve plunger 31 so as to effect delivery of both make-up evaporative liquid and treating liquid through the pipe 18 into the tank 13. When the liquid in the tank 13 rises to its predetermined normal operating level, the float rocks the cam 41 reversely, thereby opening the switch 42 to deenergize the solenoid 32, and stopping the flow of liquids through the pipe 18.

If the supply of evaporative liquid normally available through the pipe 34 should fail completely, the liquid in the tank 13 ultimately would become completely exhausted, and continued operation of the discs 10 with no available liquid for intake would be undesirable. Furthermore, if the discs 10 and blower B should continue to run when no liquid is available in the tank 13, air passing through the apparatus would not be conditioned. Accordingly, means are provided for stopping the discs 10 and the blower in the event the liquid in the tank 13 falls to a level somewhat below the level at which the switch 42 is closed for opening the valve 31. In order also to assure that whenever the air conditioning apparatus is operating the diffused or dispersed liquid will include the proper amount of treating liquid, means are provided for stopping the discs and blower in the event the treating liquid falls below a predetermined level in the reservoir 20. Preferably the means for stopping the discs and blower in response to lowering of the level in the tank 13, and the means for stopping the discs and blower in response to lowering of the level in the reservoir 20 are coordinated as parts of a common control circuit.

The mechanism for stopping the discs and motor in response to lowering of the liquid level in the tank 13 includes a micro-switch 51 adapted to be operated by a cam 52 secured to the rock shaft 36. The cam 52 is of such contour, and is so positioned on the shaft 36 that it will maintain the switch 51 closed until after the float 40 has been lowered to a position below that at which the switch 42 is closed by the cam 41. Thus, when the liquid level falls in the tank 13, the cam 41 first is effective to close the switch 42 for opening the valve 31 and adding liquid to the tank 13. Normally the liquid will be added at a rate sufficient to prevent the liquid level from falling enough to open the switch 51, the latter being opened only under emergency conditions when there is not a sufficient supply of evaporative liquid available through the pipe 34.

The mechanism for stopping the discs and blower in the event of there being an insufficient supply of treating liquid comprises a float chamber 53 which is mounted on the side of the reservoir 20 and communicates with the reservoir through an opening 54. A float 55 positioned in the chamber 53 is equipped with a rod 56 pivotally connected at its upper end to a lever 57, which is pivoted at an intermediate point on the top of a bracket 58. The free end 57a of the lever 57 extends over and holds in depressed position the movable element of a normally closed micro-switch 59. If the level of the liquid in the reservoir 20 and the chamber 53 falls to a predetermined extent, the lever 57 is rocked counterclockwise, thereby permitting the movable element of the switch 59 to rise, thus opening the circuit at this point.

In the wiring arrangement shown in Figure 2 the motors 3 and 17 are connected to the power line conductor 49 by conductors 60 and 61 respectively. The other power line conductor 50 leads to the micro-switch 59, and thence through a conductor 62 to the micro-switch 51. A conductor 63 leads from the micro-switch 51 to the motors 3 and 17. Thus, the micro-switches 51 and 59 are in series with the motors 3 and 17 so that if the switch 51 is opened by falling of the liquid in the tank 13 to a predetermined level, or if the switch 59 is opened by falling of the treating liquid in the reservoir 20 to a predetermined level, both the discs and blower will be stopped.

A signal lamp 64 may be connected across the conductors 60 and 63 so as to be illuminated constantly when the apparatus is operating normally. If the apparatus is rendered inoperative by failure of the supply of either the evaporative liquid or the treating liquid, the signal lamp 64 is extinguished so as to indicate, at any remote or desired point, that the system requires attention to be restored to operating condition.

Other suitable control devices indicated generically at 65 and including, for example, a thermostat, a humidistat, and a master control, may be inserted in the system for example in the power supply line 50.

The apparatus disclosed embodies the invention in the form now preferred, but it will be understood that changes may be made in the specific construction and relative arrangement of the illustrated parts without departing from the invention as defined in the claims.

I claim:

1. In air and liquid contact apparatus, a duct; equipment for moving air through said duct; a tank for containing evaporative liquid; equipment for taking evaporative liquid from said tank and dispersing said liquid in the air stream flowing through said duct with consequent loss of evaporative liquid by evaporation in the air moving through said duct; a conduit for supplying make-up evaporative liquid to said tank to replenish the liquid lost by evaporation; a reservoir for treating liquid; an aspirator type injector interposed in said conduit; a direct connection between said reservoir and said injector through which treating liquid is continuously introduced into said tank during supplying of make-up evaporative liquid to said tank, the injection of the make-up evaporative liquid constantly apportioning the amounts of make-up evaporative liquid and treating liquid delivered to the tank; and means responsive to lowering of the level of the treating liquid in said reservoir for stopping operation of at least one of said equipments.

2. In air and liquid contact apparatus, a duct; equipment for moving air through said duct; a tank for containing evaporative liquid; equipment for taking evaporative liquid from said tank and dispersing said liquid in the air stream flowing through said duct with consequent loss of evaporative liquid by evaporation in the air moving through said duct and with provision for return of unevaporated liquid to said tank; a conduit for supplying make-up evaporative liquid to said tank; a reservoir for treating liquid; an aspirator type injector interposed in said conduit; a direct connection between said reservoir and said injector through which treating liquid is continuously introduced into said tank during supplying of make-up evaporative liquid to said tank, the injection of the make-up evaporative liquid constantly apportioning the amounts of evaporative liquid and treating liquid delivered to the tank; a normally closed valve in said conduit; means responsive to lowering of the liquid in said tank to a first predetermined level for opening said valve; means responsive to lowering of the liquid in said tank to a second and lower predetermined level for stopping operation of at least one of said equipments; means responsive to lowering of the level of treating liquid in said reservoir for stopping operation of at least one of said equipments; and a signal operable in response to stopping of the equipment.

3. In air and liquid contact apparatus, a duct;

a blower for moving air through said duct; an electric blower-driving motor; a tank for containing evaporative liquid; means for taking evaporative liquid from said tank and dispersing said liquid in the air stream flowing through said duct with consequent loss of evaporative liquid by evaporation in the air moving through said duct; an electric disperser-driving motor; a conduit for supplying make-up evaporative liquid to said tank; a normally closed valve in said conduit; an electrical device for opening said valve; a reservoir for treating liquid; means for delivering treating liquid from said reservoir for mixing with said evaporative liquid; float means in said tank; a first switch for controlling said electrical device to effect opening of said valve; means responsive to lowering of said float means to a predetermined first level for operating said first switch; a second switch for controlling said motors; means responsive to lowering of said float means to a predetermined level lower than said first level for operating said second switch to stop said motors; a float in said reservoir; a third electric switch for controlling said motors; and means responsive to lowering of the float in said reservoir to a predetermined level for operating said third switch to stop said motors.

4. In air and liquid contact apparatus, a duct; a blower for moving air through said duct; an electric blower-driving motor; a tank for containing evaporative liquid; means for taking evaporative liquid from said tank and dispersing said liquid in the air stream flowing through said duct; an electric disperser-driving motor; a conduit for supplying make-up evaporative liquid to said tank; a normally closed valve in said conduit; an electrical device for opening said valve; a reservoir for treating liquid; means for delivering treating liquid from said reservoir for mixing with said evaporative liquid; a first float in said tank; a rock shaft; means operatively connecting said shaft to said first float for rocking the shaft in response to vertical movement of said first float; a first switch in circuit with said electrical device; a first cam on said shaft adapted to close said switch when said shaft has been rocked by lowering of said first float to a predetermined level for effecting energization of said electrical device and opening of said valve; a second switch in circuit with said motors; a second cam on said shaft adapted to open said second switch when said shaft has been rocked further by lowering of said first float to a predetermined lower level to stop said motors; a second float in said reservoir; a third switch in circuit with said motors; and connections between said second float and said third switch for opening the latter in response to lowering of said second float to a predetermined level to stop said motors.

THOMAS W. CARRAWAY.

REFERENCES CITED

The following references are of record in the file of this patent:

UNITED STATES PATENTS

| Number | Name | Date |
|---|---|---|
| 515,210 | Graves | Feb. 20, 1894 |
| 2,087,436 | Kirby | July 20, 1937 |
| 2,162,809 | Groak et al. | June 20, 1939 |
| 2,221,786 | Downs et al. | Nov. 19, 1940 |
| 2,235,116 | Ray | Mar. 18, 1941 |
| 2,437,936 | Carraway | Mar. 16, 1948 |